United States Patent [19]

Smith

[11] 4,247,067
[45] Jan. 27, 1981

[54] CAMERA MOUNT

[76] Inventor: Harlan B. Smith, 395 NW. 10th, Canby, Oreg. 97013

[21] Appl. No.: 965,990

[22] Filed: Dec. 4, 1978

[51] Int. Cl.³ ............................................. F16M 1/00
[52] U.S. Cl. ............................... 248/123.1; 248/280.1; 248/648; 248/667
[58] Field of Search ............... 248/177, 178, 183, 648, 248/652, 662, 666, 667, 278, 280.1, 279, 123.1; 352/243; 354/81

[56] References Cited
U.S. PATENT DOCUMENTS

| 2,551,180 | 5/1951 | Starr et al. | 248/183 X |
| 2,625,074 | 1/1953 | Nistri | 248/662 X |
| 2,919,876 | 1/1960 | Plain | 248/123.1 |
| 2,967,458 | 1/1961 | Stone | 248/123.1 X |
| 3,044,346 | 7/1962 | Fieux | 248/662 X |
| 3,352,521 | 11/1967 | Tyler | 248/123.1 |
| 3,467,350 | 9/1969 | Tyler | 248/179 |
| 3,776,494 | 12/1973 | Baucheron | 354/81 X |
| 3,891,301 | 6/1975 | Heller | 354/81 X |
| 4,044,364 | 8/1977 | Prinzo | 352/243 X |
| 4,118,720 | 10/1978 | Gottschalk | 354/81 |

FOREIGN PATENT DOCUMENTS

| 2217682 | 10/1972 | Fed. Rep. of Germany | 248/123.1 |
| 2241848 | 3/1975 | France | 248/179 |
| 748027 | 4/1956 | United Kingdom | 352/243 |

Primary Examiner—J. Franklin Foss
Attorney, Agent, or Firm—Kolisch, Hartwell & Dickinson

[57] ABSTRACT

A camera mount for supporting a camera in balance so that it may be panned, tilted and rolled by an operator to face a target includes a pedestal operable for selective positioning behind the operator along an arcuate path having an axis of revolution lying on an imaginary line extending through the operator's head. A first arm is pivotally connected to the pedestal adjacent an upper end thereof for pivotal movement about a roll axis, and a second arm is pivotally connected to the first arm for pivotal movement about a tilt axis, the second arm supporting the camera and a counterbalance.

3 Claims, 3 Drawing Figures

CAMERA MOUNT

BACKGROUND AND SUMMARY OF THE INVENTION

The present invention relates to universal mounts of the type for supporting an instrument, such as a camera, with the mount being adapted for positioning in a vehicle. More particularly, the present invention relates to a camera mount which may be positioned in a vehicle such as a helicopter so that the camera may be selectively positioned for panning, tilting and rolling.

Camera mounts of the universal or gimbaled type are known for use in helicopters, automobiles, airplanes, boats, dollies, etc. and are particularly advantageous because motion of the vehicle may be compensated for during filming by suitable repositioning of the mount. In particular, a universal mount permits the camera to be selectively panned, tilted or rolled to compensate for helicopter flight orientation (pitching, rolling and yawing) as a camera operator directs the camera to face a target. However, prior art camera mounts are defective from several standpoints.

In particular, one type of defect results from the fact that the camera is mounted on an elongate arm which may be pivoted about a vertical axis to provide panning. However, in order for a camera operator to maintain eye contact against an eyepiece of the camera, necessary for precise filming, it is required that the operator substantially crane or twist his head or body in order to follow the camera during panning. This is because the elongate arm, which supports the camera, is pivotally mounted for pivotal movement about a vertical axis which is located behind the operator when the operator is in position for filming. As a consequence, as the camera is panned, it swings away from the operator's head requiring the operator to assume a distorted and uncomfortable position in order to maintain head contact with the camera. Camera mounts incorporating this type of construction are exemplified in U.S. Pat. Nos. 3,352,521 and 3,467,350 issued to N. Tyler.

Another type of known camera mount is exemplified in U.S. Pat. No. 3,044,346 issued to Fieux which discloses a universally adjustable camera mount wherein the pan, tilt and roll axes all intersect at a fictitious meeting point situated substantially in the region of the cervical vertebrae of the camera operator. However, in order to provide a construction in which the pan axis extends along a line through the operator's cervical vertebrae, it has been necessary, as disclosed in the '346 patent, to provide an overhead type of construction utilizing U-shaped members. The overhead construction results in a high profile of the camera mount and the U-shaped members result in a heavy, cumbersome construction which severely limits ready ingress and egress of the operator relative to the seat of the camera mount.

Accordingly, it is a general object of the present invention to provide a mount for supporting an instrument, such as a camera, which includes an arm for holding the camera and a pedestal, the arm being connected to the pedestal and the pedestal being positioned behind the operator and operable for selective positioning along an arcuate path defined by an axis of revolution lying on an imaginary line extending through the operator's head. The particular advantage of the construction of the present invention resides in the fact that the axis of revolution permits panning of the camera about an axis extending through the operator's head so that the camera may be manually manipulated to specifically track or follow action of the operator's head. In addition, because the pedestal is located behind the operator and is operable for selective positioning or sweeping along an arcuate path also disposed behind the operator, no overhead construction of high profile is required.

Another object of the present invention is to provide a mount, as described above, in which the axis of revolution extends along an imaginary line inclined relative to the vertical. More specifically, the axis of revolution extends along an imaginary line which passes through the operator's head in a downward direction toward the rear of the operator. As a consequence, the mount may be constructed with the pedestal directly adjacent the back of the operator so that compact overall construction is provided.

Still another object of the present invention is to provide a mount, as described above, in which the pedestal includes a base positioned behind the operator including a mast arm pivotally connected to the base. The mast arm is swingable about the axis of revolution along the aforementioned arcuate path. Further, the present invention contemplates that the mast arm is provided with offset first and second portions which enable close positioning of the mast arm relative to the back of the operator.

These and additional objects and advantages of the present invention will be more clearly understood from a consideration of the drawings and the detailed description of the preferred embodiment.

DETAILED DESCRIPTION OF THE PREFERRED EMBODIMENT

Figure 1:
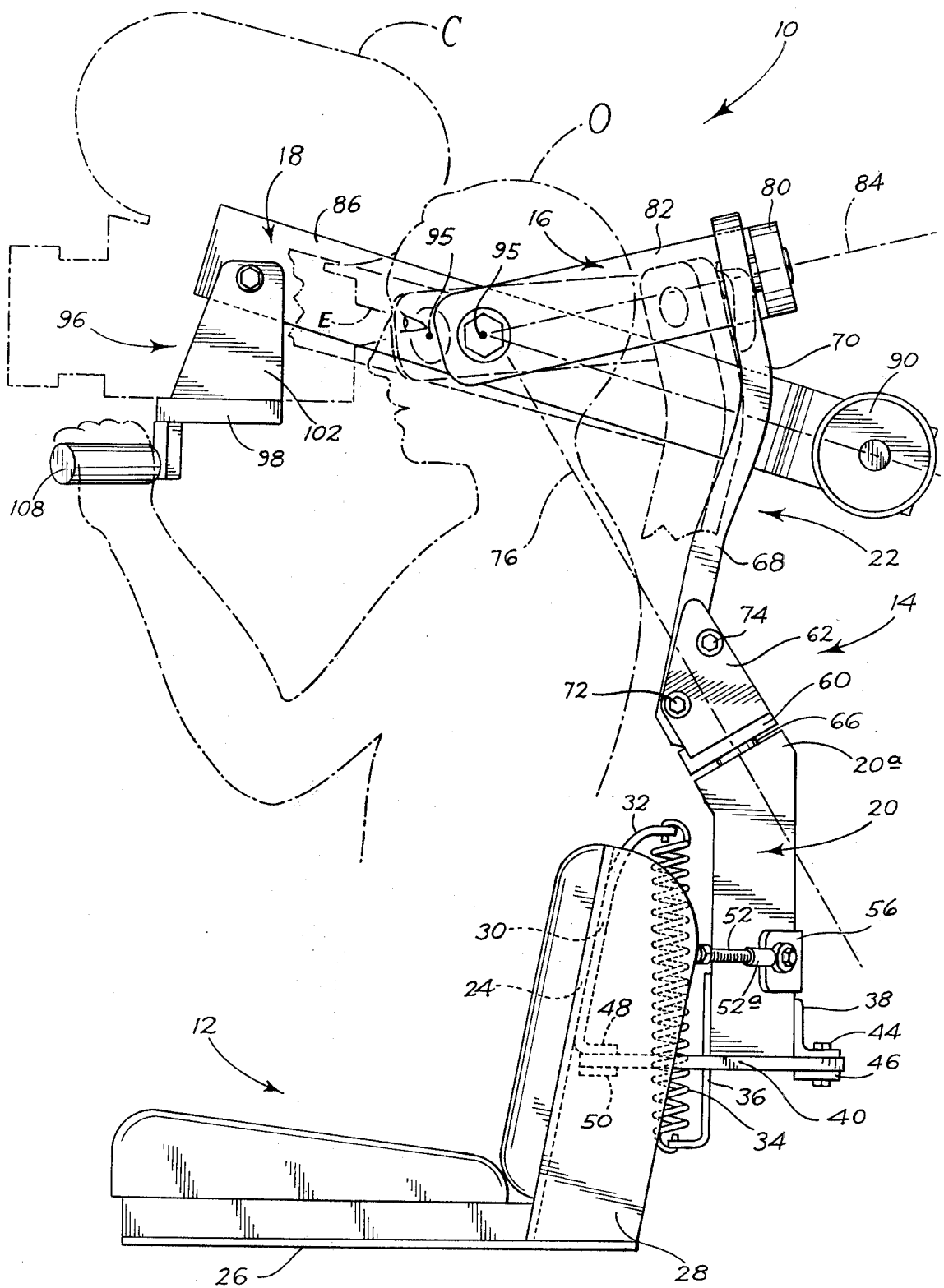
FIG. 1 is a side elevation view of a camera mount according to the present invention in assembly with a seat, an operator being shown in phantom lines seated in position for directing a camera to face a target.

Turning now to the drawings, and referring initially to FIG. 1, a mount for supporting an instrument, such as a camera according to the present invention is generally designated at 10. As illustrated, camera mount 10 is preferably a unitary assembly including a seat generally indicated at 12, a pedestal means generally indicated at 14 and first and second arm means generally indicated at 16, 18, respectively. As a brief overview, it is noted that camera mount 10, if placed in a helicopter, is generally mounted in the helicopter to face outwardly from a door generally at right angles to the longitudinal axis of the helicopter. As a consequence, in order for a camera operator to continuously position a camera for direction toward a target and compensate for motion of the helicopter, camera mount 10 must mount the camera in a universal manner.

Stated differently, and assuming that camera mount 10 is positioned in a helicopter with seat 12 secured so that the operator faces outwardly from one side of the helicopter, it can be appreciated that upon pitch of the helicopter (motion about a horizontal axis), the camera must be suitably rolled if proper orientation of the camera relative to the target is to be maintained during filming. Similarly, if the helicopter is rolled (motion about its longitudinal axis) the camera must be tilted about a tilt axis. Lastly, if the helicopter is yawed (motion about a vertical axis) the camera may have to be suitably panned in order to compensate. Of course, panning about a pan axis may be necessary to direct the camera toward a target even if the helicopter is not pitching, rolling or yawing.

With attention now redirected to FIG. 1, details of the construction of pedestal means 14 will be set forth. Specifically, the pedestal means includes a nonrotatable base, such as a post, generally indicated at 20, on which is rotatably mounted a mast arm, generally indicated at 22. As illustrated, base 20 is connected to the rear of seat 12 by means of resilient mounts. More specifically, and with reference also directed to FIG. 2, it can be seen that seat 12 is provided with a backing plate 24 which is connected to a bottom plate 26 for providing a frame structure for the seat. Suitably joined at opposite sides of backing plate 24 are a pair of side sections, one of which is indicated at 28 with apertures provided therein enabling connection to a seat frame in the helicopter. Suitably mounted on backing plate 24 is a support plate 30 having a rearwardly extending and curved flange or lip 32. The lip is provided with an aperture for mounting one end of a first damping means such as spring 34. The other end of spring 34 is joined to an end of an L-shaped bracket 36. As illustrated, bracket 36 is secured to a front side of base 20.

Base 20 is also connected to seat 12 by means of a second damping means as follows. Extending along a rear of base 20 outwardly from opposite sides thereof is an angle member 38 suitably secured to the base. A pair of flexible and resilient square or rectangular belting members indicated at 40, 42 are connected to base 20 and extend from a cantilevered connection with backing plate 24. Explaining further, and as can be seen from a consideration of FIG. 2, belting members 40, 42 are spaced-apart and positioned on opposite sides of base 20 and extend from backing plate 24 to a location adjacent the back side of base 20. Each of the belting members is secured along a rear edge thereof to base 20 by suitable bolts 44 which extend through an elongate plate 46 and angle member 38. At a forward portion of each of the belting members, they are suitably secured by bolts which extend through a pair of elongate mounting plates 48, 50 connected to backing plate 24. Thus, it can be seen that spring 34 and belting members 40, 42 provide damping means compensating for vibration of the helicopter and also provide vertical support for base 20. Spring 34 may be suitably designed to compensate for the major portion of damping required while belting 40, 42 may be designed for providing nonlinear damping.

Providing lateral support to base 20 are a pair of threaded adjustable brackets 52, 54 each of which is connected at one end thereof to a mounting member 56. Mounting member 56 is secured to base 20 and each of the adjustable brackets is pivotally connected to mounting member 56 as well as to mounting plate 30. For instance, it can be seen that adjustable bracket 52 includes a first coupling end 52a provided with an eyelet pivotally connected to mounting member 56 and a second coupling end 52b also provided with an eyelet pivotally connected to a mounting flange 58 extending rearwardly from mounting plate 30. Of course, as illustrated, tension may be taken up or relaxed along the longitudinal axis of each of the adjustable brackets by suitalbe movement of the coupling ends. It is to be noted that each of the adjustable brackets must be pivotally connected at their opposite ends to permit relative vertical movment between base 20 and seat 12.

Figure 3:
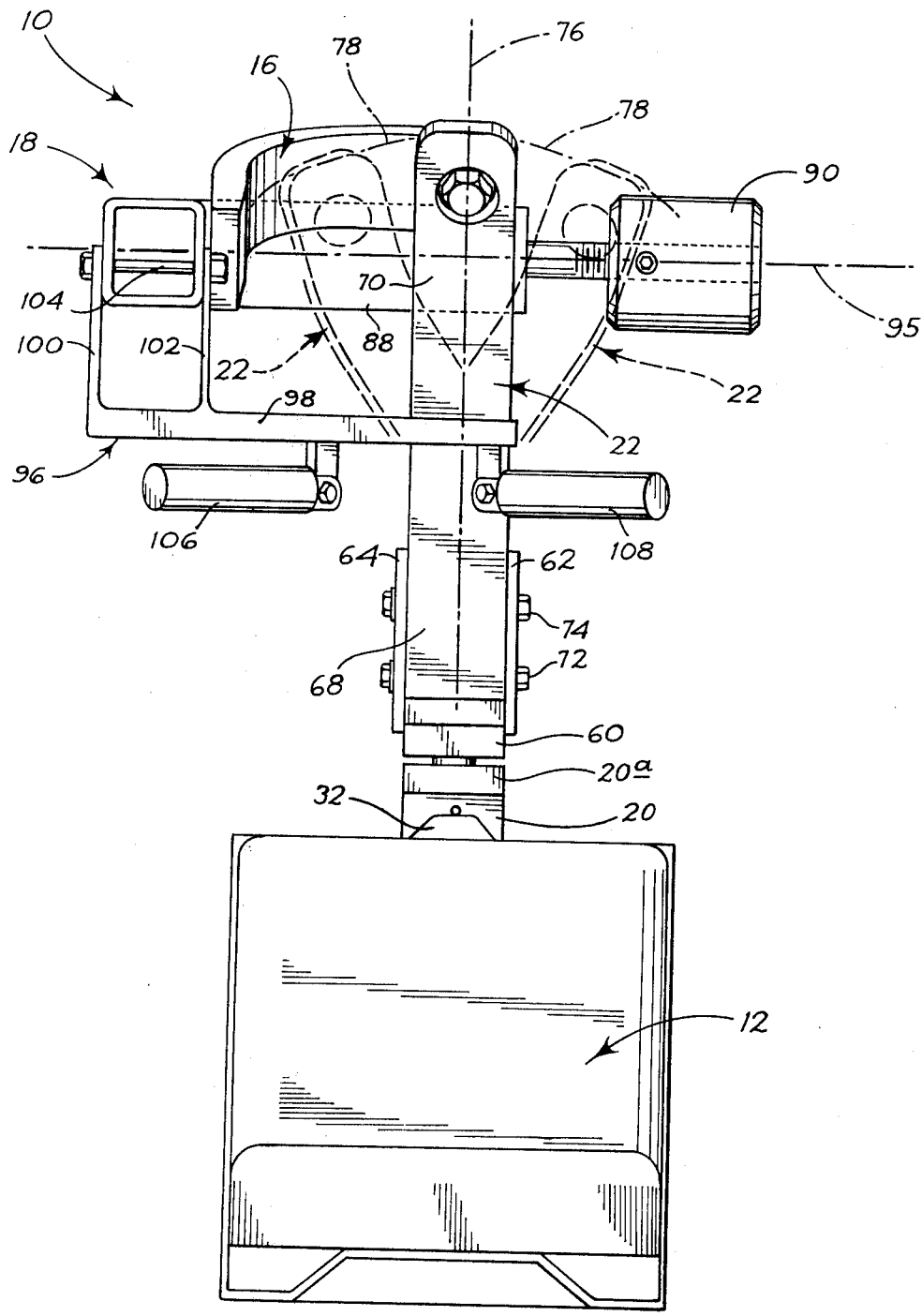
FIG. 3 is a front elevation view of the camera mount of FIG. 1 with the operator deleted for purposes of clarity.

Turning now to further details of pedestal means 14, it is noted that base 20 is provided adjacent its top with an inclined head portion 20a directed at an angle toward an operator O, shown in phantom lines. As mentioned previously, mast arm 22 is rotatably mounted on base 20, and to accomplish such, a generally U-shaped rotatable mount 60 having a pair of opposed sides 62, 64 (see FIG. 3 also) is pivotally mounted by a pin means 66 to base 20. Further, it can be seen that mast arm 22 includes an elongate member having first and second offset portions 68, 70, respectively. First portion 68 includes an aperture extending therethrough which receives a securing bolt 72 extending through opposed sides 62, 64. Another bolt 74 extends through apertures provided in opposed sides 62, 64 but does not extend through the mast arm. Rather, bolt 74 is provided so that upon tightening, clamping action of opposed sides 62, 64 rigidly against first portion 68 results so that the mast arm is tightly connected to rotatable mount 60.

As can be seen, rotatable mount 60 permits selective positioning of mast arm 22 (by action of operator O) along an arcuate path defined by an inclined axis of revolution 76 which corresponds to the axis of rotation of pin means 66. It is to be noted that the arcuate path scribed by swinging of mast arm 22 is positioned behind the operator and is best seen from a consideration of FIG. 3. As shown, the mast arm may be rotated about axis of revolution 76 along an arcuate path indicated at 78. For reasons which will be explained hereinafter, axis of revolution 76 lies on an imaginary line which extends through the operator's head and is inclined relative to the vertical.

With respect to the actual mounting of a camera, attention is now directed to first and second arm means 16, 18, respectively. Initially considering first arm means 16, it can be seen (FIG. 2) that it includes an elongate member having a first section 80 with its longitudinal axis generally perpendicular to or laterally extending from a second section 82. For purposes of construction, a curved portion interconnects the two sections. First section 80 is joined by a suitable pivotal connection to mast arm 22 adjacent second portion 70 of the mast arm. Thus, it is apparent that first arm means 16 is operable for pivotal or swinging movement relative to the mast arm about an axis which will be referred to as roll axis 84. As illustrated, roll axis 84 also lies along an imaginary line extending through the operator's head.

Figure 2:
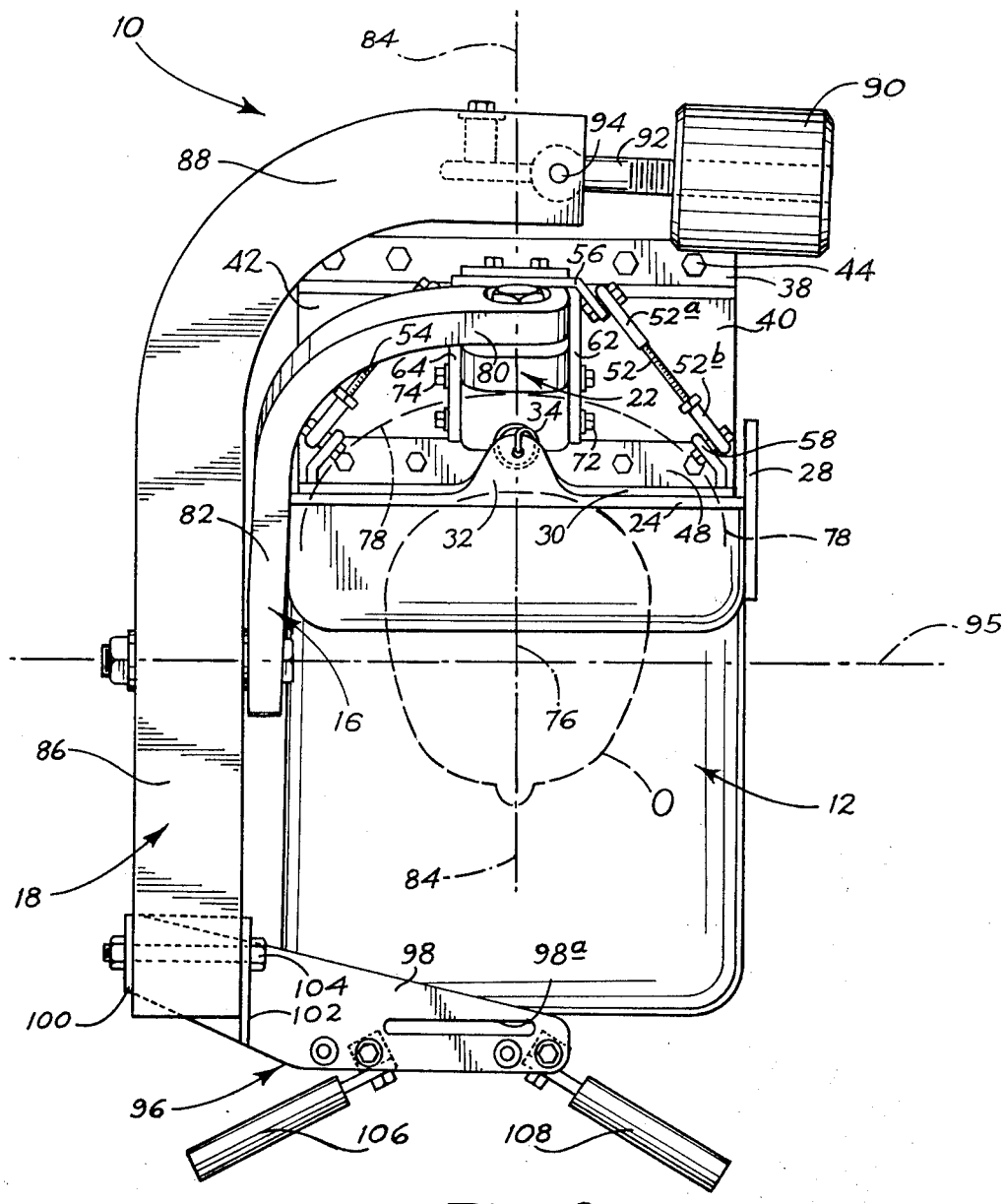
FIG. 2 is a top plan view of the camera mount with the operator's head being shown in phantom lines.

In order to mount the camera so that it may be universally mounted on the structure as described thus far, second arm means 18 is pivotally interconnected to first arm means 16 intermediate the ends of the first arm means. As shown in FIG. 2, second arm means 18 includes an elongate portion 86 which has its longitudinal axis positioned generally at right angles to another portion 88. Adjacent an end of portion 88 is a counterweight or counterbalance 90 which is provided with a threaded bore for receiving a threaded rod 92. Threaded rod 92 is suitably connected to portion 88 and may also be selectively positioned relative thereto about a pivot connection 94. Returning now to a consideration of the front of second arm means 18, it can be seen that a mounting bracket, generally indicated at 96 for mounting an instrument, such as a camera, includes a shelf 98 from which upwardly extends a pair of spaced-apart apertured sides 100, 102 for receiving a connecting bolt 104. Also, shelf 98 is provided with an elongate slot 98a for receiving mounting bolts to secure a camera to the shelf, and suitable handles for gripping by the operator are indicated at 106, 108. As shown in FIG. 2, second arm means 18 is pivotally connected to first arm means 16 for pivotal movement about a tilt axis indicated at 95.

OPERATION OF THE CAMERA MOUNT

The use and operation of camera mount 10 of the present invention in a helicopter will now be described. Initially, the passenger seat in the helicopter is removed and seat 12 of camera mount 10 is positioned in place and secured to the helicopter so that the seat is directed to face outwardly at, say, right angles to the longitudinal axis of the fuselage of the helicopter. Next, a camera C is suitably mounted on shelf 98 in a preselected position. The operator is then seated and secured to seat 12 by means of seatbelts (not shown). During flight of the helicopter, and with the operator's right eye pressing against an eyepiece E of camera C, filming of a target by facing or directing the camera toward the target may take place. Assuming that the helicopter is flying or hovering in a substantially level orientation, the operator may wish to follow a target, either on the ground or in the air, by panning the camera.

In panning, for instance to the left (see FIGS. 1 and 2), the operator will swing camera C and first arm means 18 to the left. Because axis of revolution 76 is inclined and extends along an imaginary axis through the operator's head, the camera will be panned so as to track and follow motion of the operator's head as the head turns to the left. This is because mast arm 22 moves along arcuate path 78 in a direction which tends to follow turning of the head.

As shown in dot-dash in FIG. 1, mast arm 22 has assumed a new position (during a left hand panning sequence) and first and second arm means 16, 18, respectively, are also shown in dot-dash. It is to be noted that tilt axis 95 is maintained at substantially the same height, relative to some datum (such as the bottom of the seat) so that the eyepiece is maintained at the same height relative to the operator's head so camera C follows his eye. It is important that tilt axis 95 be maintained at a relatively constant height, relative to a datum, so that camera C may be maintained at a predetermined height relative to the operator's head and eye.

Considering tilting of camera C about tilt axis 95, it is only necessary for the operator either to look downwardly or upwardly and correspondingly swing second arm means 18 either downwardly or upwardly. Because tilt axis 95 extends along an imaginary line running through the operator's head, any head action may be directly tracked by camera C and its eyepiece. Similarly, if it is desired to roll camera C about roll axis 84, the camera, and its eyepiece, will track motion of the operator's head. Of course, any combination of panning, tilting or rolling by the operator's head may be directly followed by camera C becuase all three axes (axes 76, 84 and 95) lie on imaginary lines extending through the operator's head.

It is to be noted that it is not necessary for axis of revolution 76 to extend directly through the common intersection of roll axis 84 and tilt axis 95. Actually, in order to preserve proper balancing of the system, axis of revolution 76 will be positioned somewhat behind the common intersection of axes 84, 95 but nonetheless will lie on an imaginary line extending through the operator's head.

Thus, it may be appreciated that the operator may rotate his head about a vertical axis for panning (though mast arm 22 revolves around inclined axis of revolution 76) and shift camera C so that it directly tracks such panning movement. In addition, assuming that the helicopter is pitched, the operator may roll his head, and correspondingly camera C about roll axis 84 to compensate for the pitch. Further, if the helicopter rolls, the operator may tilt his head, which is tracked by tilting camera C about tilt axis 95.

From the above description, it should be recognized that the construction of camera mount 10 of the present invention provides several distinct and important advantages. For instance, because mast arm 22 is mounted on an inclined rotatable mount, the mast arm may be positioned relatively close to the back of the operator. It is apparent that if the mast arm were mounted for vertical rotation on base 20, it would be positioned further away from the back of the operator. Of course, the inclination of mast arm 22 provides for a more compact total camera mount structure which provides lighter weight and less bulk. In addition, by offsetting second portion 70 of mast arm 22, it is positioned more proximally to the back of the operator's head thereby also providing a more compact overall construction.

Another space saving advantage results from the use of inclined axis of revolution 76. Elaborating further, it can be seen that mast arm 22 may revolve around an axis lying on an imaginary line extending through the operator's head without requiring some type of overhead construction. Certainly, it can be appreciated that the elimination of an overhead construction further reduces total overall height of the camera mount thereby making it more accessible for positioning in helicopters or other relatively cramped areas.

Of course, a principal advantage of the present invention resides in the fact that the operator need not crane or twist his neck and body in order to follow a camera as the camera is panned, tilted or rolled. Rather, as explained in detail above, any action by the operator with respect to his head may be precisely tracked by suitable positioning of camera C. To best appreciate this feature, it is only necessary to imagine oneself seated and moving one's head with the camera accurately tracking motion of the head. It is not be necessary for the operator to unnaturally lean forwardly or crane his neck in order to follow a camera as is the case in a conventional camera mount. Certainly, it can be appreciated that operator effieciency and lack of fatigue as well as precise camera control result from use of camera mount 10 of the present invention.

Still another advantage of the present invention resides in the fact that first arm means 16 is pivotally connected, in cantilever manner, to mast arm 22 for pivotal movement about roll axis 84. This enables direct pivotal connection of second arm means 18 to first arm means 16 so that the second arm means is pivotal about axis 95. As such, second arm means 18 may be shortened somewhat to enable the counterbalance to be brought closer to pedestal means 22 so that a more overall compact camera mount construction is provided.

A further advantage of the present invention resides in the fact that it is not necessary to pivotally mount shelf 98 on portion 86 of second arm means 18. Explaining further, because conventional camera mounts generally do not provide for rotation, along a pan axis extending through the operator's head, it is necessary to provide an operator with means for rotating the camera about its mounting to an arm. Of course, with the present invention, such additional rotatable mounting is not required because camera C is mounted on second arm means 18 so that it will track or follow motion of the operator's head.

While the present invention has been described with reference to the foregoing preferred embodiment, it is to be understood that other changes in form and detail may be made within the spirit and scope of the invention as defined in the appended claims.

It is claimed and desired to secure by Letters Patent:

1. A camera mount for supporting a camera in balance so that it may be panned, tilted and rolled by an operator to face a target comprising:

pedestal means including a mast arm operable for selective positioning behind the operator along an arcuate path having an axis of revolution lying on an imaginary line extending through the operator's head, said axis of revolution being inclined relative to the vertical, said pedestal means further including a base positioned behind the operator with said mast arm being rotatably mounted on said base for selective rotation about said axis of revolution;

first arm means including an elongate member having a laterally extending section which is pivotally connected to said mast arm adjacent an upper end thereof for pivotal movement about a roll axis, said roll axis lying on an imaginary line extending through the operator's head; and second arm means pivotally connected to said first arm means for pivotal movement about a tilt axis, said tilt axis lying on an imaginary line extending through the operator's head and said second arm means supporting the camera and a counterbalance.

2. The camera mount of claim 1 wherein said mast arm includes first and second portions offset from one another.

3. The camera mount of claim 1 wherein said base is positioned upright and includes an inclined portion adjacent its top for receiving a rotatable mount, said rotatable mount being connected to said mast arm.

* * * * *